Figure 1:
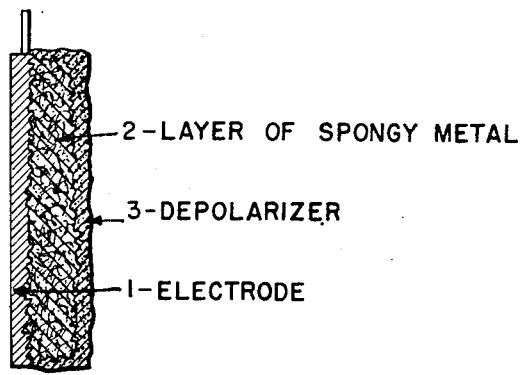

INVENTORS
RENE AUDUBERT
CORIOLAN CALMAR

Patented Feb. 23, 1954

2,670,395

UNITED STATES PATENT OFFICE 2,670,395

METHOD FOR THE PREPARATION OF DEPOLARIZERS FOR ELECTRIC CELLS

René Audubert and Coriolan Calmar, Paris, France

Application May 1, 1950, Serial No. 159,397

Claims priority, application France May 7, 1949

2 Claims. (Cl. 136—136)

A number of known depolarizers are formed of insoluble salts which through the action of the hydrogen formed on the positive pole of an electric cell are reduced more or less partially: $PbSO_4$, $HgSO_4$, $CuO$, $Cu_2O$, $AgCl$, $AgBr$, $AgI$, $CuCl$, $CuI$ and the like.

The depolarizing capacity of these substances is bound, on the one hand, to their oxidizing power and, on the other hand, to the active surface which they offer.

For this reason most of the known depolarizers which offer a limited active surface have a reduced depolarizing action.

The present invention has for its objects the remedy of this drawback.

The invention relates to a method for coating an electrode by means of a depolarizer, said method being characterized in that a porous and resistant layer adhering to the electrode and forming a support is formed on the surface of the electrode and a layer of a depolarizing product which, thus having a large active surface and for this reason possesses a high effectiveness, is formed on said support.

According to a characteristic feature of the invention the porous supporting layer formed on the surface of the electrode is formed of a metal and the depolarizing substance is formed of the insoluble salt of this metal.

According to another characteristic feature of the invention the layer of insoluble metallic salt which forms the depolarizer is formed of a metal which constitutes the porous layer forming the support:

(a) by chemical action, (b) and by electro-chemical action.

According to still another feature of the invention the porous layer which forms the support for the depolarizing substance is obtained by coating the electrode with a reducible metal producing mixture and then by reducing this metal producing mixture, the metal then remaining in the state of a porous and resistant layer on the surface of the electrode.

It is known, on the other hand, that in certain cells the non-polarizable element is formed of a deposit of insoluble metallic salts on the metal of the electrode.

For this purpose very different metallic salts such as silver and mercury chlorides, sulphides, sulfates, iodides, bromides, carbonates, phosphates, iodates, the lead sulphates and carbonate, copper iodate and iodide and the like are employed, the metal of the metallic salt being or not being the same as that which forms the electrode.

The depolarizing action of these layers of metallic salts is based upon the fact that when the electrode operates as an anode the polarization hydrogen reduces the metallic salt of the layer into the state of a metal. This results in a destruction of this depolarizing layer and in the necessity of regenerating it.

Methods are known for the regeneration of the depolarizing layers from a metal through the action of chemical substances. Thus, metallic chlorides and iodides are obtained, for example, through the action of chlorine or iodine.

These known methods require the use of very expensive chemical substances as well as long and repeated manipulations.

It is also known that in storage batteries the depolarizing layer is regenerated through the action of the electric current but a reconstruction of 80% at the most of the primitive layer is arrived at in the prior art.

The present invention has also for its object to provide a method for the regeneration of the depolarizing substances with an efficiency near 100% and with the minimum of expenses and labour.

The invention relates to a method for the reconstitution of a depolarizing layer, more particularly on the anode of an electric cell, characterized in that a depolarizing layer of the same nature as the initial layer is reconstituted through electrolysis and in the very middle of the element such as a cell on an anode which has already been in operation.

According to a characteristic feature of the invention the reconstitution of the depolarizing layer is effected in an electrolyte containing ions capable of yielding an insoluble salt with the metal of the electrode.

According to one form of execution of the invention an electrolyte is used which contains OH ions.

According to a characteristic feature of the invention the conditions of the electrolysis such as (a) the concentration of the electrolyte, (b)

the density of the current, (c) the pH of the electrolyte, (d) the temperature of the electrolyte, are regulated so that the electrolysis may be possible and in order that the obtained depolarizing layer has a predetermined electrochemical capacity and the required thickness.

Lastly, the invention extends to the hereinafter described characteristic features and to their various possible combinations.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

In connection with that more detailed description, there is shown in the drawings, in Fig. 1, a briefed sectional view showing the electrode 1 on the surface of which spongy metal layer 2 is located, the metal having undergone chemical modification in its preparation from the salt of the metal constituted in the depolarizer 3.

Figure 2:
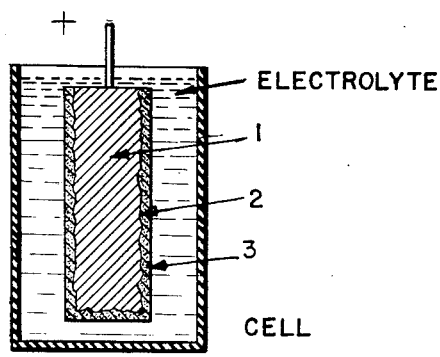

Fig. 2, a sectional view representing an electrolytic cell containing the anode 1 covered by porous metal layer 2, this latter covered by the insoluble salt 3 formed from the porous metal layer of the electrode due to the effect of electrolysis.

The positive electrode may be silver, the negative electrode magnesium and the electrolyte-sodium chloride.

According to the invention a depolarizer on the basis of silver chloride, for example, is prepared in the following manner:

One starts from a soluble silver salt such as silver nitrate in solution, for example.

To said solution of silver nitrate a solution of soda or potash is added, thus forming silver hydroxide which precipitates.

The precipitate is collected and washed and spread onto the surface of the electrode which is to be coated with the depolarizer.

Said precipitate may also be compressed around said electrode.

The so coated electrode is placed in a kiln and maintained at a temperature of about 550° C. during the time which is necessary for completely reducing the silver hydroxide precipitate. Then there remains on the surface of the electrode only a metallic silver layer which is very porous and, consequently, has a very large active surface.

In order to increase the development of the surface of the silver layer one may introduce into the precipitate before spreading it on, the electrode charges or emulsions which disappear later through vaporization, heating or through reduction. In practice, such charges are formed of organic bodies which are practically eliminated through combustion (naphthalene, paradichlorobenzene and the like). When a porous silver layer has thus been formed on the electrode silver chloride is formed electrochemically on the silver layer. The so prepared electrode may then be used in known manner.

One may work in the same manner with other depolarizers, for example in the case of a depolarizer on the basis of a lead salt; while starting for example from the hydrate it is possible to coat the electrode and later to treat the same at a suitable temperature in a hydrogen atmosphere in order to obtain on the electrode a porous lead layer on which a layer of lead sulphate, lead oxide, lead chloride and the like is formed by electro-chemical or chemical means.

The method may be used for obtaining the salts of numerous metals such as silver, mercury, lead, zinc, cadmium, copper, nickel, iron, vanadium.

The electrodes obtained by the method according to the invention show a very large active surface and possess, owing to this fact, a high and durable depolarizing power.

According to the invention a depolarizing layer of the same nature as that of the initial layer is reconstituted more particularly on the anode of an electric cell by working through electrolysis on a mass which has already been in operation.

For this operation an electrolyte is used which contains ions such as $Cl^-$, $SO_4^=$, $I^-$, $Br^-$, $CO_3^=$, $PO_4$, $IO_3$ and the like capable of yielding an insoluble salt with the base metal.

The properties of the so formed layer and, more particularly, its electro-chemical capacity essentially depend on the conditions under which the electrolysis is effected.

As a matter of fact, the proportion of radical giving rise to the salt to be obtained is bound up with the presence of other anions such as $OH^-$ ions in the electrolyte.

It is thus necessary that the efficiency of the formation of chloride, sulphate and the like be as high as possible.

For these reasons, the conditions of the electrochemical operation will be determined with precision (density of the current, concentration and nature of the electrolye, pH, temperature).

All these conditions vary from one depolarizing electrode to the other.

By way of example in the case of a silver chloride electrode the best conditions of the electrolysis for the formation of a depolarizing layer of a high capacity on said electrode are the following:

Concentration of the $Cl^-$ ions between $\frac{1}{10}$ and 2 N.

Density of current: 5 to 20 amp. per $dm^2$ of anodic surface.

pH between 5 and 8.

Temperature from 10° C. to 30° C. according to the concentration.

The pH and the temperature are only optimum but non-imperative conditions.

The above described method makes it possible, more particularly, to obtain the following technical advantages:

(1) It requires no chemical substances such as chlorine or iodine and the like.

(2) It makes it possible through the control of the conditions of the electrolysis to adjust the speed of reconstitution of the depolarizing layer as well as certain of its properties, for example its electro-chemical capacity.

In the case of silver chloride it is thus possible to prepare depolarizing layers with a current efficiency near the unity and representing a depolarization efficiency (coefficient of use) of the order of 95 to 98%.

We claim:

1. A process for the reconstitution of a depolarizing layer on the silver chloride anode of an electrolyte cell comprising covering the anode with a porous metal layer, reconstituting from said layer the depolarizing layer by applying a current density to the anode of from 5 to 20 amperes per square decimeter, adding to the electrolyte a concentration of chloride ions ranging between 1/10 normal to 2 normal, maintaining the temperature between 10° C. and 80° C. and regulating the pH of the electrolyte between 5 and 8.

2. A process for the reconstitution of a depolarizing layer on the anode of an electrolytic cell comprising covering the anode with a porous metal layer, reconstituting the depolarizing layer from said porous metal layer in an electrolyte containing ions which produce an insoluble salt with the metal of the electrode, and effecting electrolysis at an electrolyzing temperature, thereby depositing on the anode the depolarizing layer with the desired electrochemical capacity and desired thickness.

RENÉ AUDUBERT.
CORIOLAN CALMAR.

References Cited in the file of this patent

UNITED STATES PATENTS

| Number | Name | Date |
| --- | --- | --- |
| 552,211 | Thurnauer | Dec. 31, 1895 |
| 692,298 | Jungner | Feb. 4, 1902 |
| 975,980 | Morrison | Nov. 15, 1910 |
| 2,078,143 | Jumau | Apr. 20, 1937 |
| 2,428,850 | Lawson | Oct. 14, 1947 |
| 2,445,306 | Lawson | July 13, 1948 |